(12) United States Patent
Zhang et al.

(10) Patent No.: US 9,279,529 B2
(45) Date of Patent: Mar. 8, 2016

(54) BREAKAWAY THREAD-LOCK QUICK CONNECT/DISCONNECT COUPLING

(75) Inventors: Geoffrey R. Zhang, Van Nuys, CA (US); Tim Carmody, Camarillo, CA (US); Jose M. Alandy, Camarillo, CA (US); Siavosh S. Kakavand, Santa Paula, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 1168 days.

(21) Appl. No.: 13/272,264

(22) Filed: Oct. 13, 2011

(65) Prior Publication Data
US 2012/0090696 A1    Apr. 19, 2012

Related U.S. Application Data

(60) Provisional application No. 61/392,769, filed on Oct. 13, 2010, provisional application No. 61/441,805, filed on Feb. 11, 2011.

(51) Int. Cl.
| | |
|---|---|
| *F15D 1/00* | (2006.01) |
| *F16L 37/14* | (2006.01) |
| *F16L 29/04* | (2006.01) |

(52) U.S. Cl.
CPC ............... *F16L 37/148* (2013.01); *F16L 29/04* (2013.01); *Y10T 137/0402* (2015.04); *Y10T 137/9029* (2015.04)

(58) Field of Classification Search
CPC ... F16L 37/32; F16L 55/1007; F16L 55/1015; F16L 55/1022; F16K 17/406; Y10T 137/9029; Y10T 137/0402

USPC ......... 137/67, 614.11, 614.04, 614.05, 68.14, 137/68.15, 68.16, 15.09; 285/2, 3, 91, 92, 285/304, 305

See application file for complete search history.

(56) References Cited

U.S. PATENT DOCUMENTS

| | | | |
|---|---|---|---|
| 2,666,656 A |   | 1/1954 | Bruning |
| 3,236,251 A | * | 2/1966 | Hansen .................. 137/614.05 |
| 3,719,194 A |   | 3/1973 | Anderson et al. |
| 3,921,656 A |   | 11/1975 | Meisenheimer, Jr. et al. |
| 4,090,524 A |   | 5/1978 | Allread et al. |
| 4,232,697 A |   | 11/1980 | Meisenheimer, Jr. |
| 4,295,484 A |   | 10/1981 | Meisenheimer, Jr. |
| 4,328,822 A |   | 5/1982 | Wilhelm |
| 4,351,352 A |   | 9/1982 | Meisenheimer, Jr. |
| 4,469,354 A |   | 9/1984 | Caldwell |
| 4,567,924 A |   | 2/1986 | Brown |
| 4,611,618 A |   | 9/1986 | Fournier et al. |
| 4,614,201 A | * | 9/1986 | King et al. .................. 137/68.15 |
| 4,899,792 A | * | 2/1990 | Podgers ........................ 141/382 |
| 6,149,102 A |   | 11/2000 | Marasco et al. |
| 7,815,705 B2 |   | 10/2010 | Ehrenberg |

* cited by examiner

*Primary Examiner* — Kevin Lee
*Assistant Examiner* — P. Macade Nichols
(74) *Attorney, Agent, or Firm* — Renner, Otto, Boisselle & Sklar, LLP

(57) ABSTRACT

A female coupler for a breakaway thread-lock quick disconnect coupling having a retainer wire positioned interiorly of an outer housing and a coupler support portion that prevents contamination of the retainer wire and a capture space formed by grooves in the outer housing and an inner housing, which may prevent degradation of performance and/or decrease the chances that the retainer wire is dislodged.

20 Claims, 12 Drawing Sheets

BREAKAWAY THREAD-LOCK QUICK CONNECT/DISCONNECT COUPLING

RELATED APPLICATIONS

This application claims the benefit of U.S. Provisional Application No. 61/392,769 filed Oct. 13, 2010 and U.S. Provisional Application No. 61/441,805 filed Feb. 11, 2011, all of which are hereby incorporated herein by reference.

FIELD OF INVENTION

The present invention relates generally to couplings and more particularly to quick connect/disconnect couplings.

BACKGROUND

During normal operation or servicing of an aircraft, the aircraft is often subject to scheduled, unscheduled or emergency repairs or maintenance. Separation of one sub-system from its main system is a routine maintenance procedure. In order to increase working efficiency, reduction of the processing time to disconnect and reconnect the sub-systems is desired for the entire maintenance or repair mission.

In order to do so, quick connect/disconnect couplings have been provided to allow for quick connection/disconnection and sealing of a female and male component. In such couplings, the male and female components are connected together, for example, by pushing the male part into the female part. The coupling can be provided with a release mechanism to disconnect the male and female components. Known quick connect/disconnect couplings have included a female coupler having a retainer wire on an outer diameter of an outer housing to retain in place components of the coupler. In such a coupling, the retainer wire is exposed to environmental elements and has the potential of being dislodged during use.

SUMMARY OF INVENTION

In contrast, the present invention provides a female coupler for a breakaway thread-lock quick disconnect coupling having a retainer wire positioned interiorly of an outer housing and a coupler support portion. The invention prevents contamination of the retainer wire and a capture space formed by grooves in the outer housing and an inner housing, which may prevent degradation of performance and/or decrease the chances that the retainer wire is dislodged.

In particular, the female coupler includes a retainer wire, an inner housing having a radially outwardly opening groove and a nipple portion for sealing to an inner diameter surface of a corresponding male coupler, an outer housing having a radially inwardly opening groove aligned with the radially outwardly opening groove, wherein the grooves form a capture space for receiving the retainer wire, the retainer wire having a dimension greater than a depth of each groove so that when the retainer wire is inserted into the capture space, the wire axially interferes with sidewalls of the grooves to restrict relative axial movement of the inner and outer housings, and a female coupler support having a proximal end rotatably supported on a radially outer surface of the inner or outer housing and a distal end being internally threaded for threaded receipt of an externally threaded portion of the corresponding male coupler.

In a preferred embodiment, the outer housing includes a loading hole extending from a radially outer surface of the outer housing to a radially inner surface of the outer housing and through which the retainer wire can be inserted into the capture space, and wherein a sleeve radially outwardly surrounds the outer housing and is axially shiftable between a first position permitting access to the loading hole and a second position covering the access hole to prevent the retainer wire from being dislodged from the capture space.

According to another aspect of the invention, there is provided a female coupler having an actuating sleeve rotatably coupled to a female coupler support for rotation therewith, the actuating sleeve having seals at interfaces to prevent entry of contaminants into an interior of the female coupler for preventing contamination of a bearing and a retainer wire.

In particular, the female coupler includes a female coupler support having a proximal end rotatably supported on a radially outer surface of an inner or outer housing and a distal end being internally threaded for threaded receipt of an externally threaded portion of a corresponding male coupler, and an actuating sleeve rotatably coupled to the female coupler support for rotation therewith, wherein a plurality of seals are provided at interfaces of the actuating sleeve that prevent environmental particles from migrating into cavities in the female coupler.

According to another aspect of the invention, a quick connect/disconnect coupling is provided that includes a breakaway feature, whereby a frangible connection is provided that is configured to break when a load on the coupling exceeds a predetermined value, thereby allowing poppet valves to disengage and move to their respective closed positions.

In particular, the quick connect/disconnect coupling includes mating female and male quick connect/disconnect couplers each having a main body configured for connection to a respective sub-system, and a poppet valve disposed in an interior flow passage of the respective coupler and biased toward a closed position but movable to an open position by engagement with the poppet valve of the other coupling when the female and male couplers are coupled together. The main body of at least one of the female and male couplers includes an inner portion effecting the connection to the other coupler and an outer portion carrying the respective poppet valve, and wherein the inner and outer portions are joined to one another by a frangible connection configured to break when a load on the coupling exceeds a predetermined value, and wherein separation of the outer portion from the inner portion allows the poppet valves to disengage and move to their respective closed positions.

According to yet another aspect of the invention, a method of closing a fluid flow path through a quick connect/disconnect coupling when a load on the coupling exceeds a predetermined value is provided, wherein the coupling includes mating female and male couplers each having a main body configured for connection to a respective sub-system and a poppet valve disposed in an interior flow passage having a closed position and an open position whereby the poppet valve is engaged with the poppet valve of the other coupling when the female and male couplers are coupled together, the method includes, separating one of the male or female couplers at a frangible connection that joins an inner portion of the coupler effecting the connection to the other coupler and an outer portion of the coupler carrying the respective poppet valve, disengaging the poppet valves, and moving the poppet valves to their respective closed positions thereby closing the fluid flow path.

The foregoing and other features of the invention are hereinafter described in greater detail with reference to the accompanying drawings.

DETAILED DESCRIPTION

Figure 1:
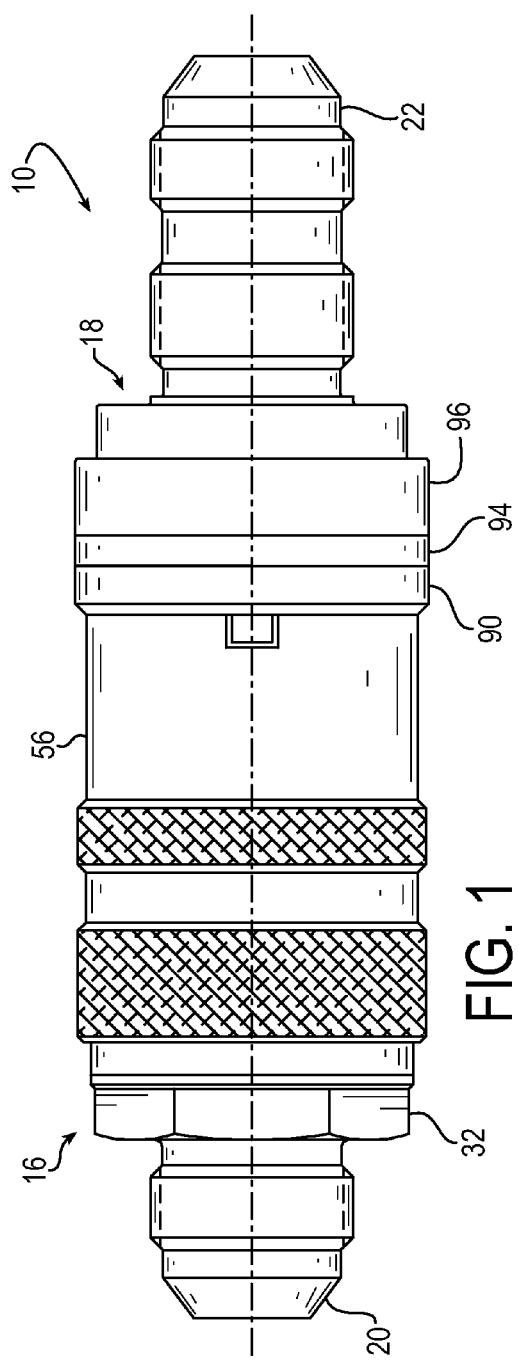
FIG. 1 is a side view of an exemplary breakaway thread-lock quick disconnect coupling according to the invention.
Figure 2:
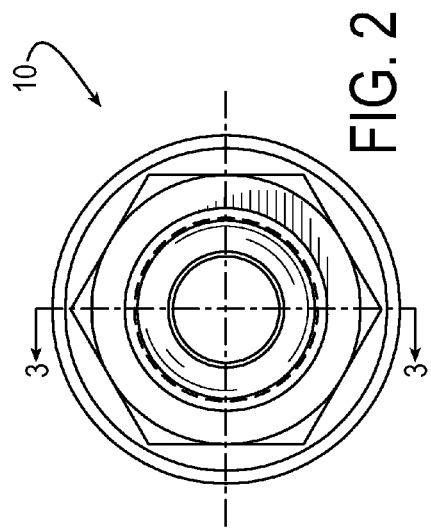
FIG. 2 is an end view of the breakaway thread-lock quick disconnect coupling of FIG. 1.
Figure 3:
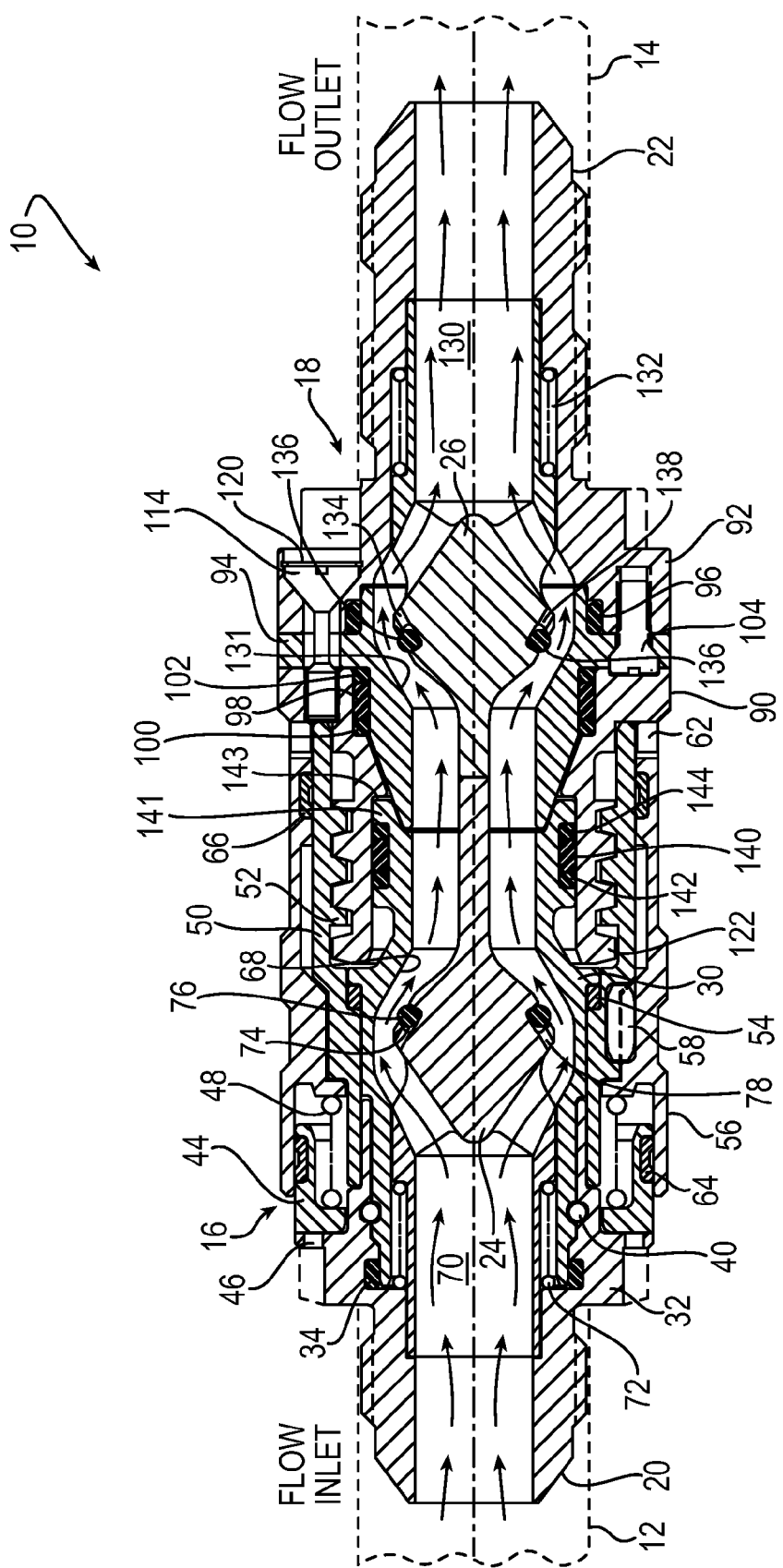
FIG. 3 is a cross-sectional view of the breakaway thread-lock quick disconnect coupling taken substantially along the line 3-3 of FIG. 2.

Referring now to the drawings in detail, and initially to FIGS. 1-3, an exemplary breakaway thread-lock quick disconnect coupling 10 is illustrated. The coupling may be used for various fluid systems, such as aircraft and automotive fuel lines, hydraulic fluid lines, etc. The coupling 10 may be used to connect a first sub-system 12 to a second sub-system 14 to allow fluid to be conveyed between the two sub-systems and to allow for a quick connection/disconnection between the two sub-systems.

Referring now in detail to FIG. 3, the breakaway thread-lock quick disconnect coupling 10 generally includes a female coupler 16 and a male coupler 18 configured to couple to the sub-systems 12 and 14, respectfully. The female and male couplers 16 and 18 are coupled to the subsystems by fittings 20 and 22, which may be any suitable fittings, such as hex fittings. The female and male couplers 16 and 18 may then be coupled together, as discussed in detail below, to form a flow passage from the first sub-system 12 to the second sub-system 14. The flow passage is opened through the couplers 16 and 18 by poppet valves 24 and 26 disposed in the couplers that are moved from a closed position (shown in FIGS. 5 and 9) to an open position (shown in FIG. 3) when the couplers are connected.

Figure 4:
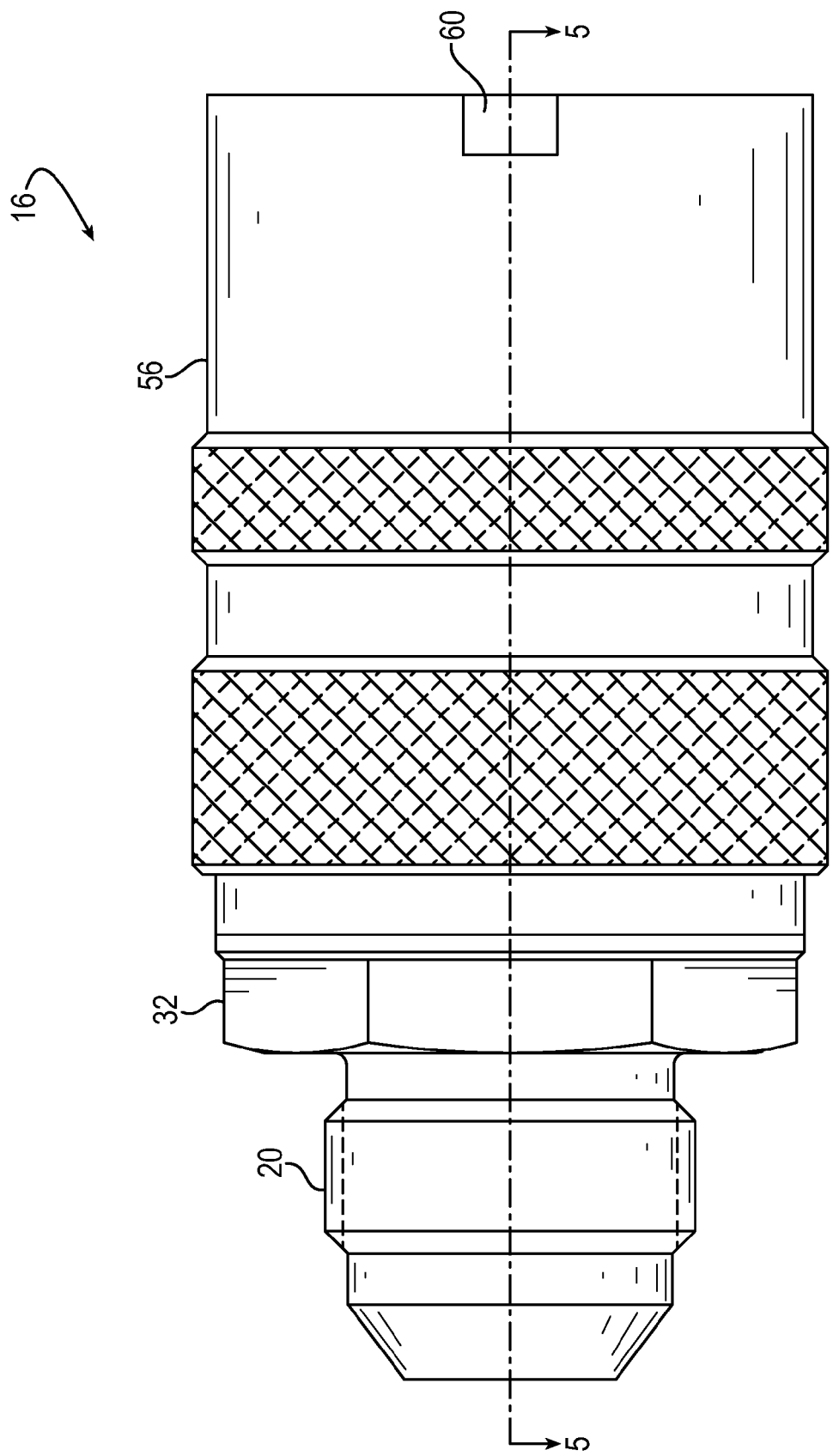
FIG. 4 is side view of an exemplary female coupler according to the invention.
Figure 5:
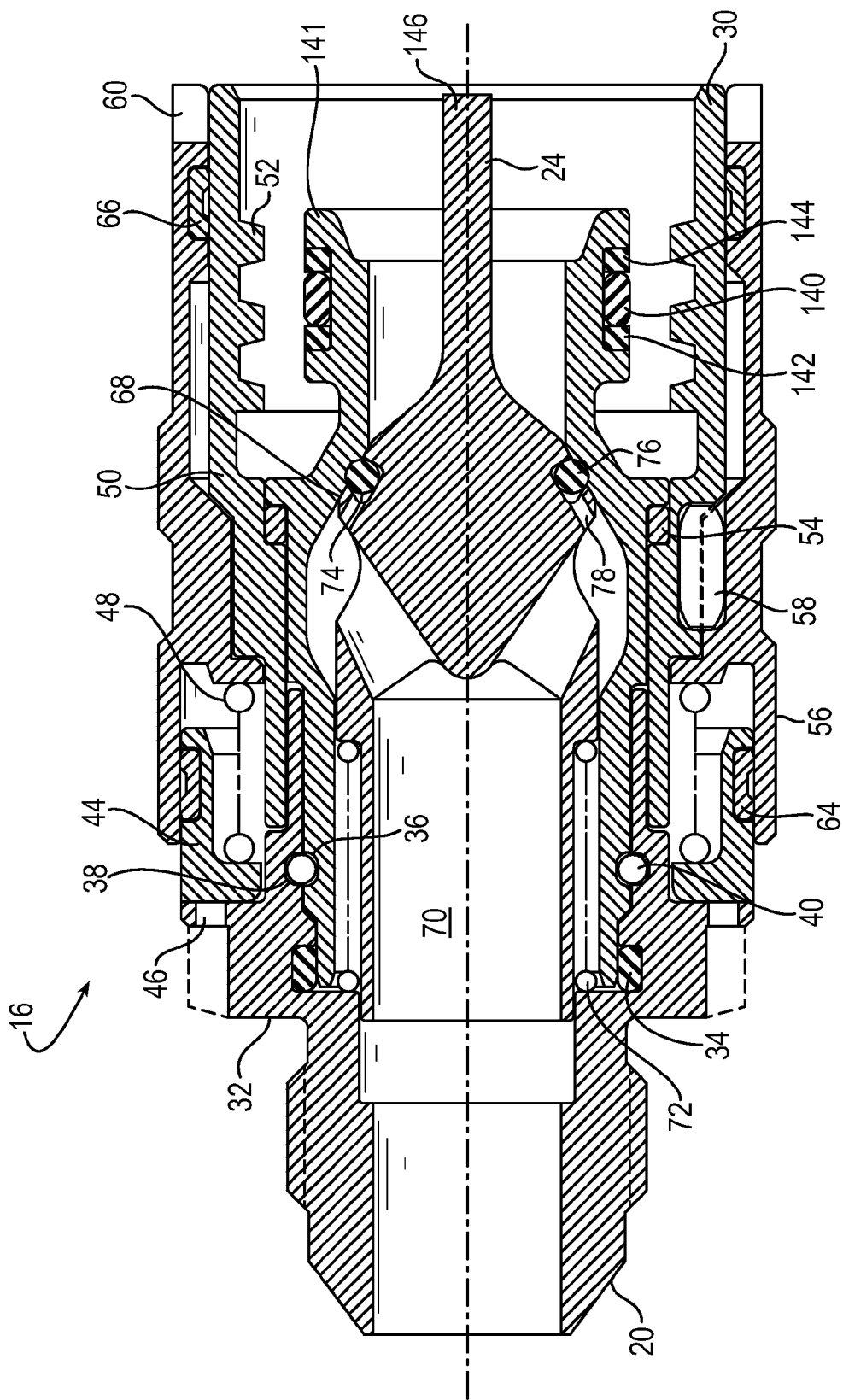
FIG. 5 is a cross-sectional view of the female coupler taken substantially along the line 5-5 of FIG. 4.
Figure 6:
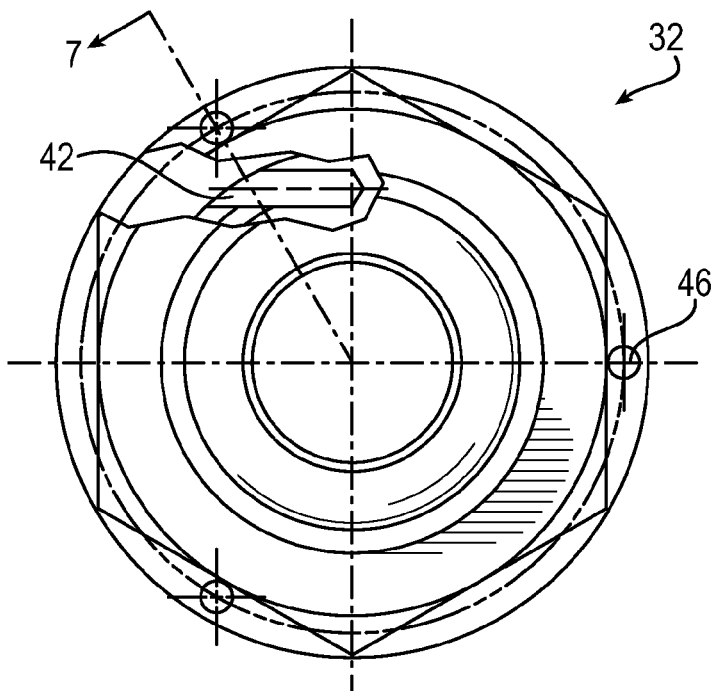
FIG. 6 is an end view of an outer housing of the female coupler.

Referring additionally to FIGS. 4 and 5 the female coupler includes an inner housing 30 and an outer housing 32 that may be sealed by a suitable seal, such as o-ring 34 disposed in a rod seal gland of the outer housing 32. The inner housing 30 includes a radially outwardly opening groove 36 and the outer housing 32 includes a radially inwardly opening groove 38 aligned with the radially outwardly opening groove 36, the grooves forming a capture space for receiving a retainer wire 40. The retainer wire 40 has a dimension greater than a depth of each groove so that when the retainer wire is inserted into the capture space, the wire axially interferes with sidewalls of the grooves to resist relative axial movement of the inner and outer housings 30 and 32. It will be appreciated, however, that the grooves may have an axial length to allow for minimal movement of the inner and outer housings.

Figure 7:
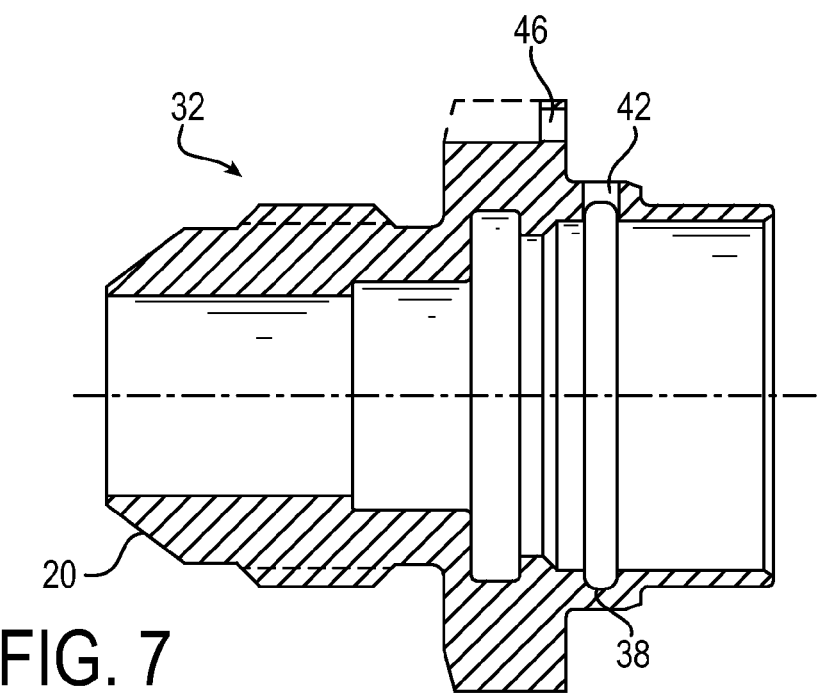
FIG. 7 is a cross-sectional view of the outer housing taken substantially along the line 7-7 of FIG. 6.

The retainer wire 40 may be inserted into the capture space through a loading hole 42 in the outer housing, shown in FIG. 7, which extends from a radially outer surface of the outer housing 32 to a radially inner surface of the outer housing. When the female coupler is assembled, the loading hole 42 will be covered by a spacer 44, in the form of a sleeve, which radially outwardly surrounds the outer housing 32. Access to a proximal end of the spacer 44 is provided by a plurality of openings 46 in the outer housing 32. The openings 46 provide access to the spacer 44 so that the spacer may be axially moved against a resilient member 48, such as a spring. The spacer 44 is axially movable between a first position permitting access to the loading hole and a second position covering the loading hole 42 to prevent the retainer wire 40 from being dislodged from the capture space. The spacer 44 also prevents environmental particles, such as dust, from migrating into the capture space by means of a pressed engagement between the spacer and the outer housing 32, although a suitable seal may be provided.

The female coupler 16 also includes a female coupler support 50 having a proximal end rotatably supported on a radially outer surface of the inner housing 30 and on the radially outer surface of the outer housing 32. The female coupler support 50 includes a plurality of internal threads 52 on a distal end thereof, such as modified Acme STB threads, which are configured for threaded receipt of an externally threaded portion of the corresponding male coupler 18, discussed below in more detail. To reduce rotating friction when the female coupler 16 is connected to and disconnected from the male coupler 18, a bearing ring 54 is provided between the inner housing 30 and the female coupler support 50.

Disposed on radially outer surfaces of the female coupler support 50 and spacer 44, and rotatably coupled to the coupler support for rotation therewith is an actuating sleeve 56. To prevent the actuating sleeve from rotating relative to the coupler support, a dowel pin 58 is provided that is disposed in a slot between the actuating sleeve 56 and the coupler support 50. The dowel pin 58 also allows a torsional load experienced by the actuating sleeve 56 to be transferred from the actuating sleeve to the female coupler support 50 through the dowel pin 58 when the female coupler 16 is being connected to or disconnected from the male coupler 18.

The actuating sleeve 56 is movable between a latched position and a released position. As shown, the actuating sleeve 56 is biased in the latched position by the resilient member, such as a spring 48, which is disposed between the actuating sleeve 56 and the spacer 44 and supported on a shoulder of the spacer. To lock the actuating sleeve 56 to the male coupling 18, the actuating sleeve includes a plurality of locking slots 60 on a distal end thereof that drop into corresponding locking tangs 62 (FIG. 8) on the male coupler. To prevent environmental particles, such as dust, from migrating into the cavities in the female coupler when the actuating sleeve is displaced, dust ring 64 is provided between the spacer 44 and the actuating sleeve 56 and dust ring 66 is provided between the female coupler support 50 and the actuating sleeve 56.

The female coupler 16 also includes the spring biased female coupler poppet valve 24 disposed interiorly of the inner housing 30. The valve 24 is movable between open and closed positions to open/close a flow passage 70 in the female coupler 16. In the illustrated embodiment, the valve 24 is biased in a closed position against an interior surface of the inner housing, such as a valve seat 68 by a resilient member 72, such as a spring, which is supported on a shoulder of the outer housing 32. The valve 24 includes a groove 74, such as a dovetail seal groove, that carries a suitable seal 76, such as an o-ring or bonded seal, to seal the valve 24 when in the closed position to the valve seat. Openings 78 are provided on the backside of the dovetail seal groove 74 to prevent the seal 76 from being dislodged from the groove 74 when the coupling 10 is subjected to a large surge flow.

Figure 8:
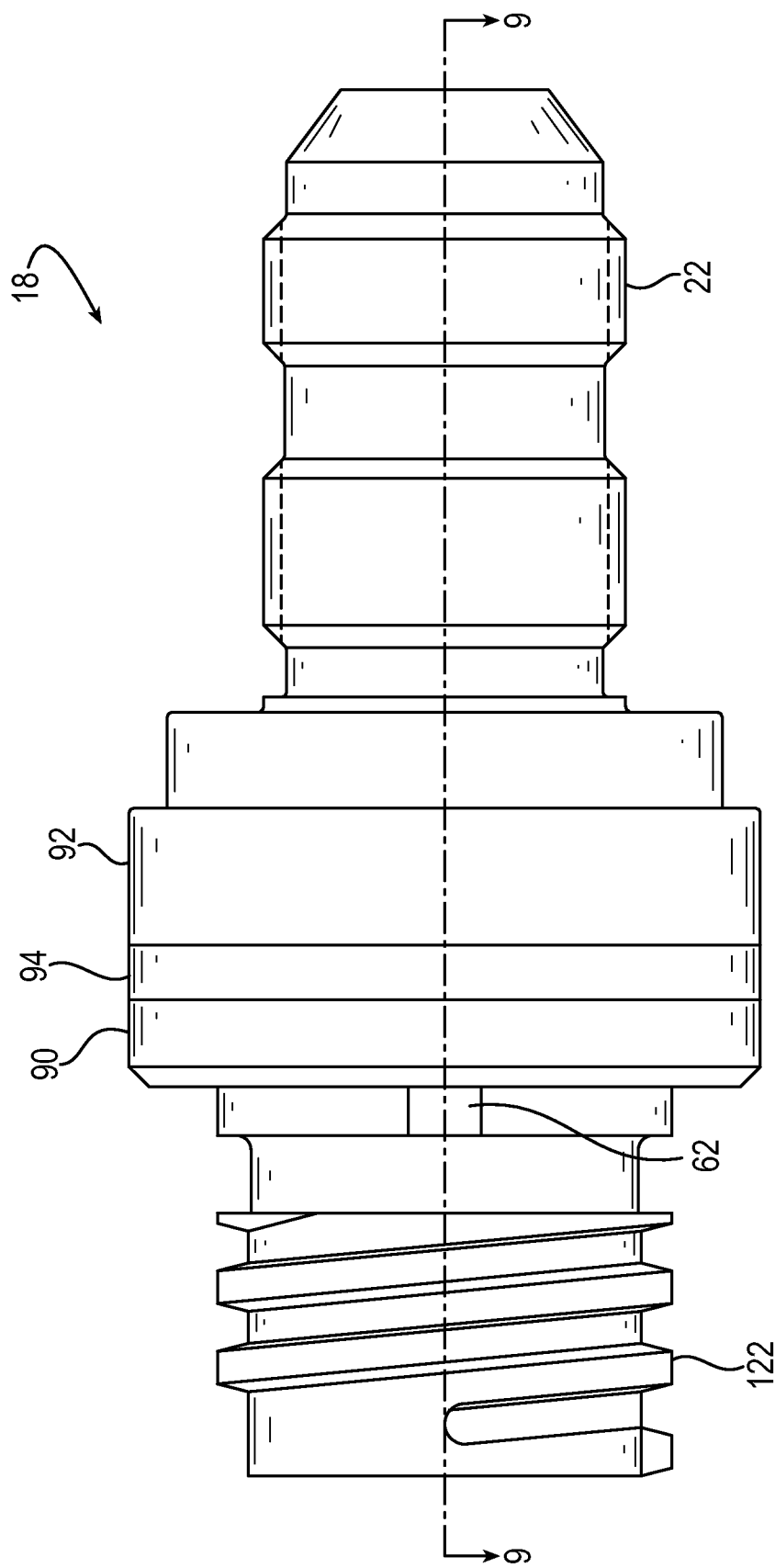
FIG. 8 is a side view of an exemplary male coupler according to the invention.
Figure 9:
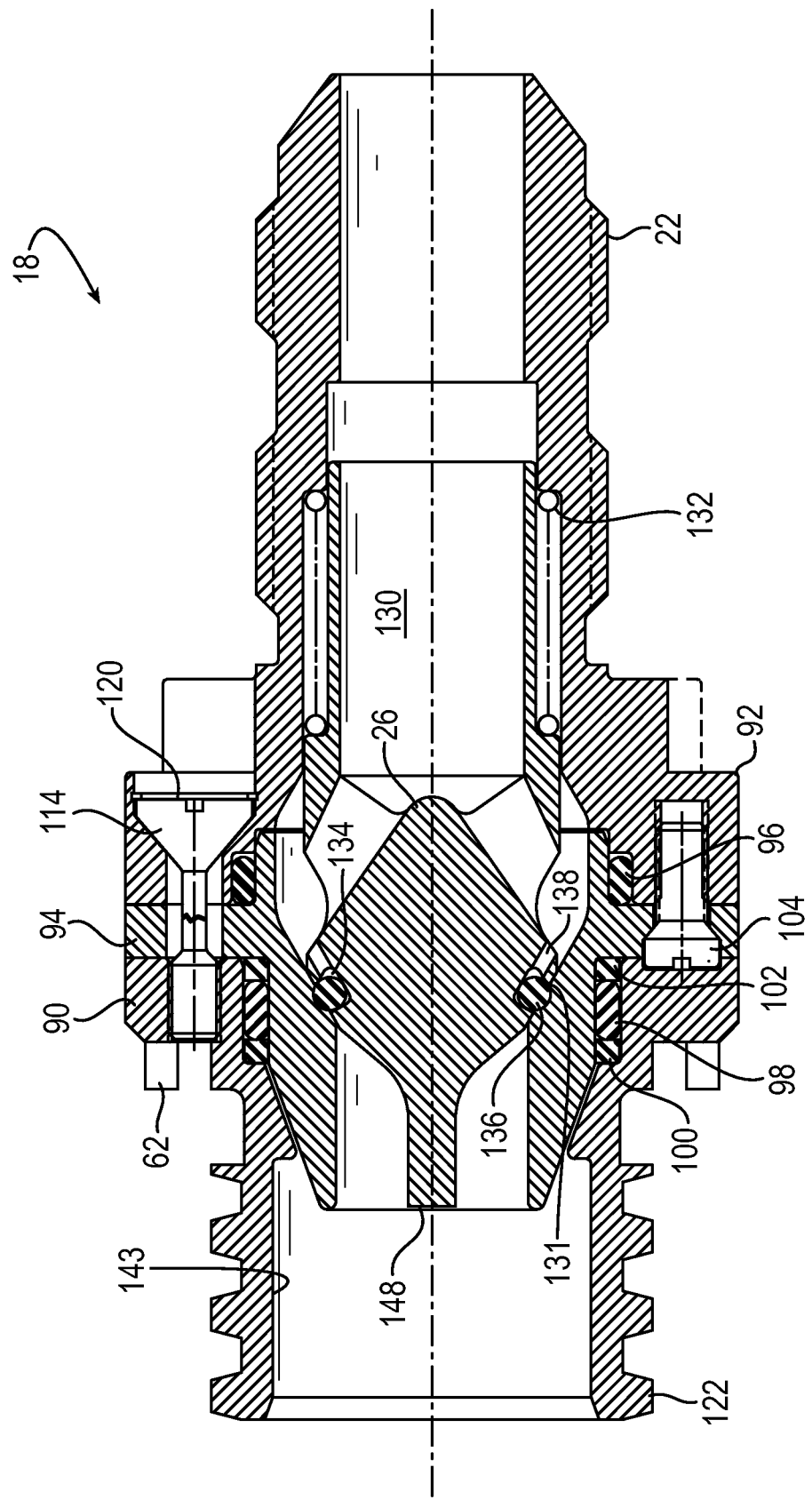
FIG. 9 is a cross-sectional view of the male coupler taken substantially along the line 9-9 of FIG. 8.

Turning now to FIGS. 3 and 8-15, and originally to FIGS. 3, 8 and 9, the male coupler 18 is described in detail. The male coupler includes an inner housing 90, an outer housing 92, and a male coupler support 94 disposed between the inner and outer housings. The male coupler support 94 is sealed to the outer housing 92 by a suitable seal, such as o-ring 96 disposed in a rod seal gland of the outer housing 92, and sealed to the inner housing 90 by suitable seals, such as o-ring 98 and back-up rings 100 and 102 disposed in a rod seal gland of the inner housing 90.

Figure 10:
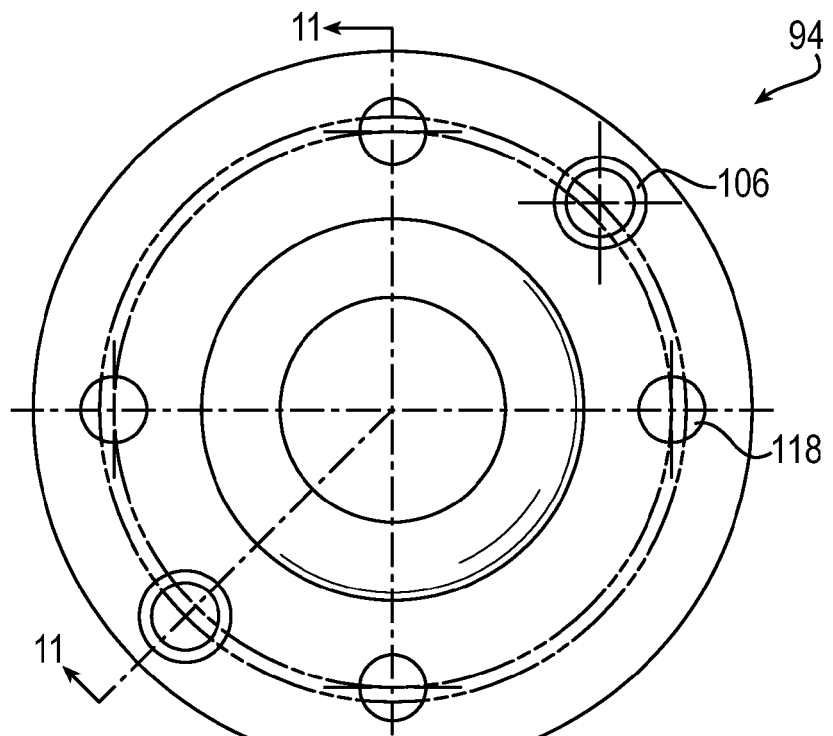
FIG. 10 is a left end view of a male coupler support of the male coupler.
Figure 11:
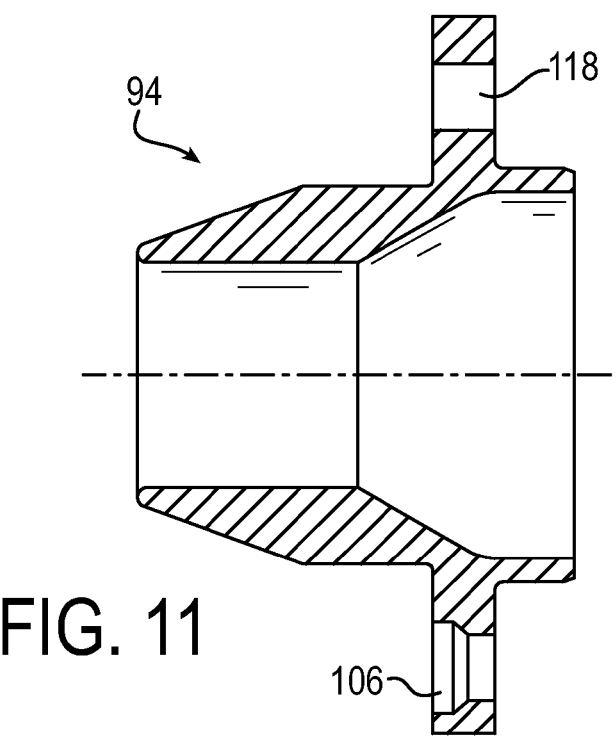
FIG. 11 is a cross-sectional view of the male coupler support taken substantially along the line 11-11 of FIG. 10.
Figure 12:
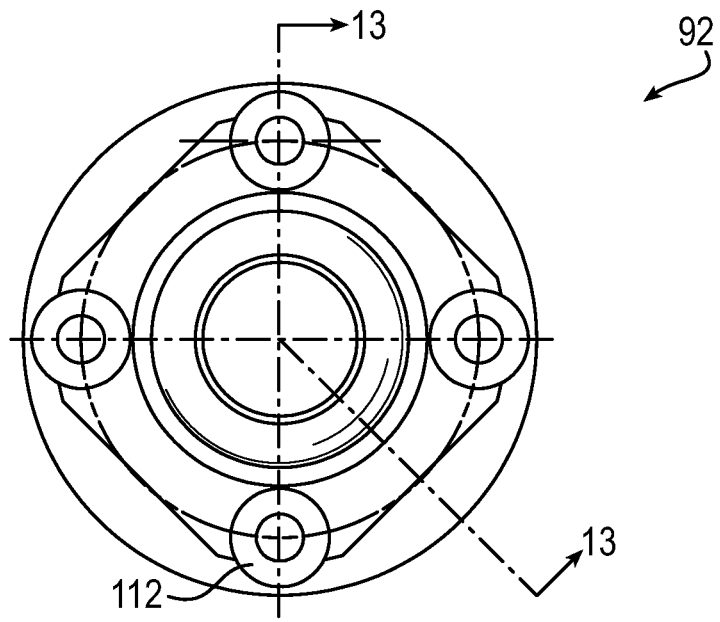
FIG. 12 is a right end view of an outer housing of the male coupler.
Figure 13:
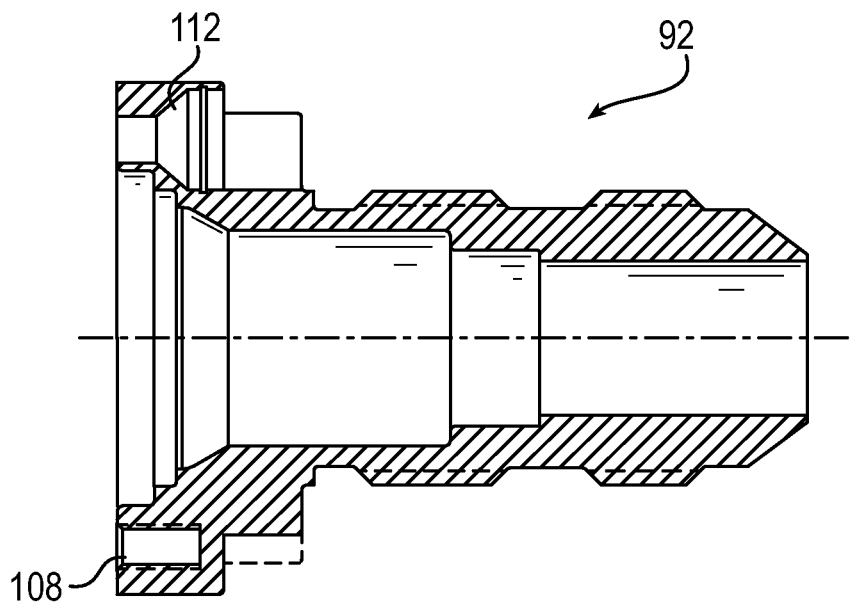
FIG. 13 is a cross-sectional view of the outer housing of the male coupler taken substantially along the line 13-13 of FIG. 12.
Figure 15:
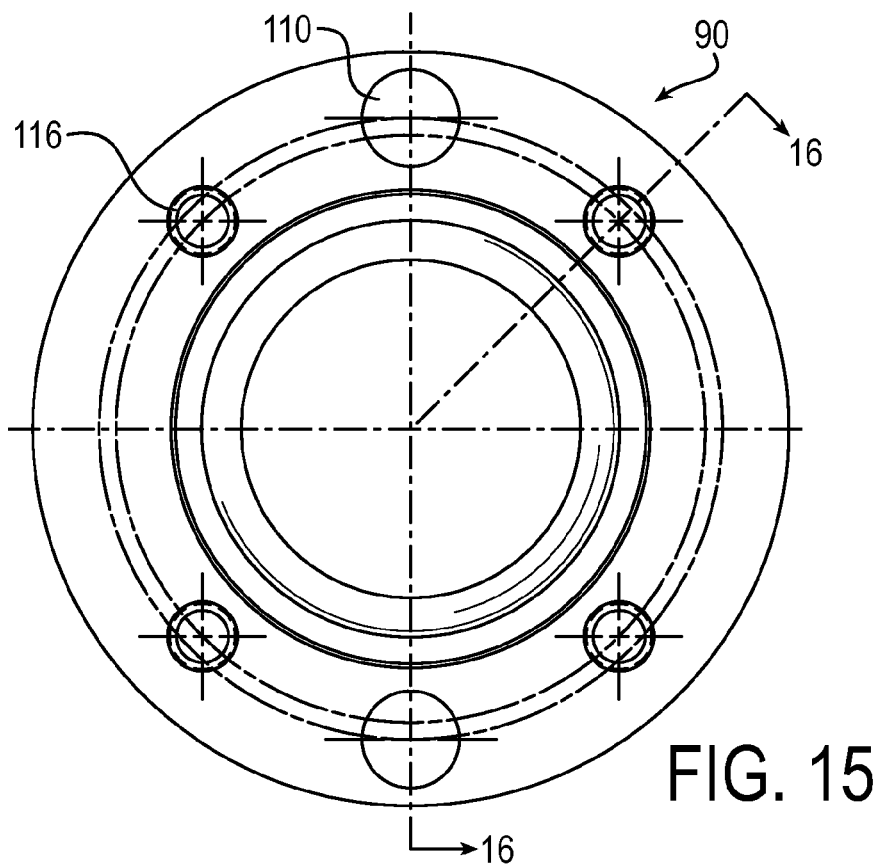
FIG. 15 is a right end view of an inner housing of the male coupler.
Figure 16:
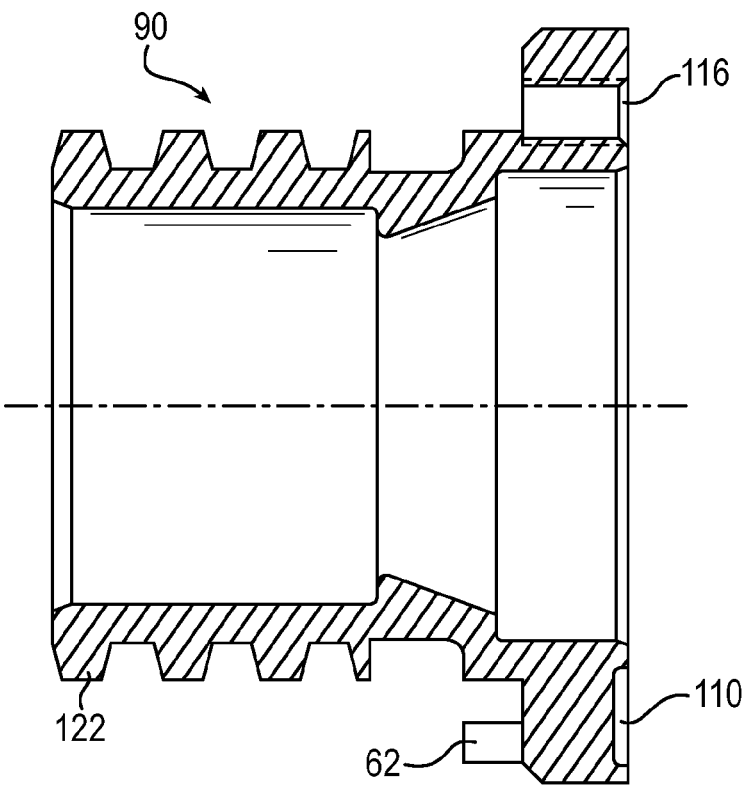
FIG. 16 is a cross-sectional view of the inner housing of the male coupler taken substantially along the line 16-16 of FIG. 15.

The male coupler support is coupled to the outer housing by a plurality of screws 104, such as joint screws. In the illustrated embodiment, two joint screws are provided, although it will be appreciated that any appropriate number of joint screws may be provided. As best shown in FIGS. 10 and 12, the male coupler support 94 includes a plurality of openings 106, which may be countersunk, for receiving the screws 104, and the outer housing 92 includes a plurality of threaded openings 108 aligned with openings 106 for receiving threaded ends of the joint screws. As shown in FIG. 15, the inner housing includes a plurality of recesses 110 aligned with openings 106 for receiving a portion of the heads of the screws 104 when the male coupler is assembled.

Figure 14:
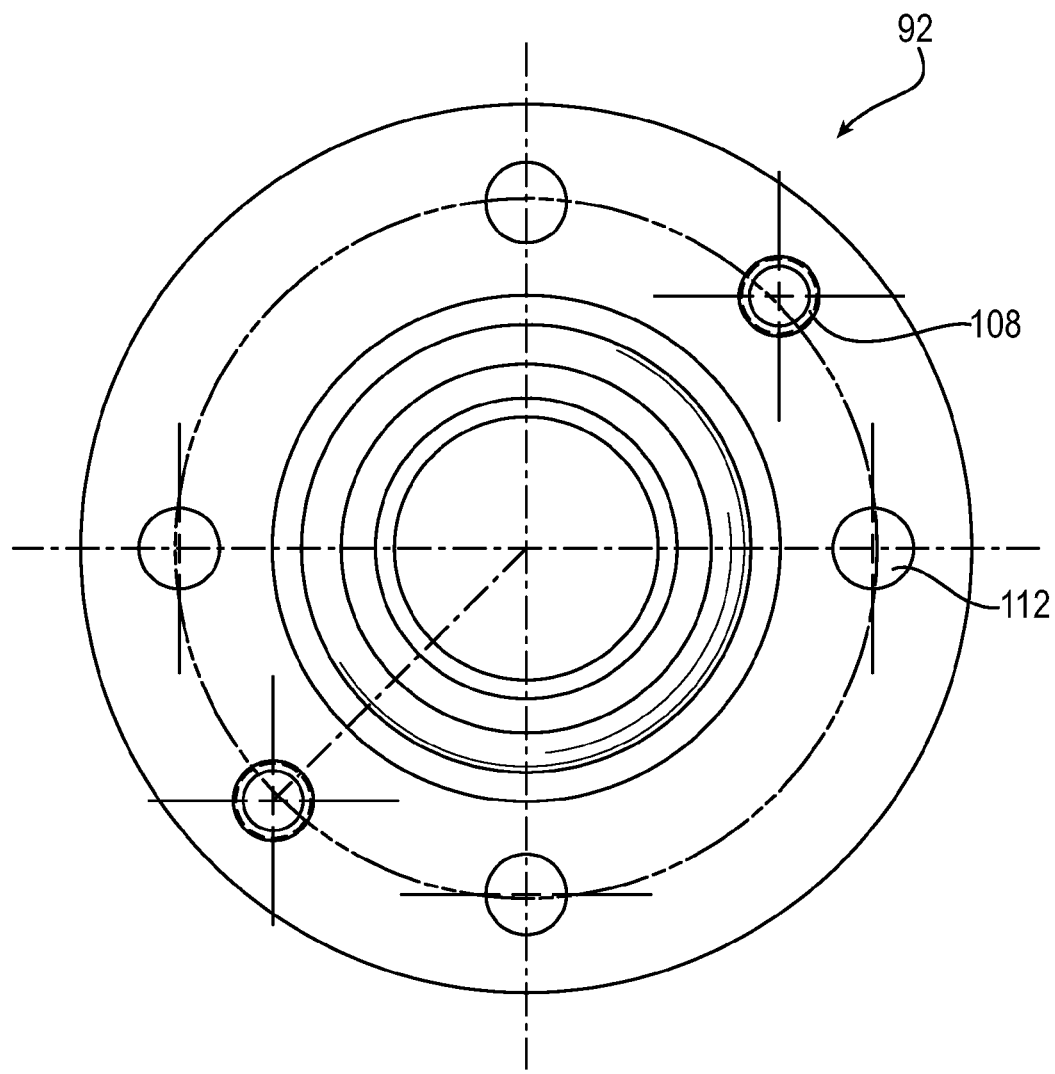
FIG. 14 is a left end view of the outer housing of the male coupler.

To couple the inner and outer housings 90 and 92, the outer housing includes a plurality of openings 112, best shown in FIGS. 12 and 14, which may be countersunk. Each opening is configured to receive a screw 114, such as a fuse screw, and the inner housing includes a plurality of threaded openings 116 aligned with the openings 112 for receiving threaded ends of the fuse screws 114. In the illustrated embodiment, four fuse screws are provided, although it will be appreciated that any appropriate number of fuse screws may be provided. Openings 118 are provided in the male coupler support 94 that are aligned with openings 112 and 116 to allow the fuse screws 114 to pass through the coupler support 94 to the openings 116 in the inner housing 90. When installed, the fuse screws do not contact the wall of the opening 118 because the screws 114 have a controlled fuse neck diameter that is less than the diameter of the opening 118, and the fuse screws are designed to be broken under a range of specified breaking loads. When the screws are broken, the fuse screws 114 are secured in the outer housing 92 by smalley retainer rings 120 adjacent the heads of the fuse screws.

To couple the male coupler 18 to the female coupler 16, the inner housing 90 includes a plurality of external threads 122 on distal end thereof, such as modified Acme STB threads, which are configured for threaded receipt of the corresponding threads on the female coupler 16. To lock the male coupler to the female coupler, the male coupler is provided with the plurality of locking tangs 62 that receive the locking slots 60, thereby forming a detent locking mechanism. In the illustrated embodiment, the inner housing 90 includes two tangs, although it will be appreciated that any suitable number of tangs may be provided.

The male coupler 18 also includes the spring biased male coupler poppet valve 26 disposed interiorly of the male coupler support 94 and outer housing 92. The valve 26 is movable between open and closed positions to open/close a flow passage 130 in the male coupler. In the illustrated embodiment, the valve 26 is biased in the closed position against an interior surface of the coupler support 94, such as a valve seat 131, by a resilient member 132, such as a spring, which is supported on a shoulder of the outer housing 92. The valve includes a groove 134, such as a dovetail seal groove, that carries a suitable seal 136, such as an o-ring or bonded seal, to seal the valve 26 in the closed position to the valve seat. Openings 138 are provided on the backside of the dovetail seal groove 134 to prevent the seal 136 from being dislodged from the groove when the coupling 10 is subjected to a large surge flow.

Turning again to FIG. 3, to connect the female coupler 16 and the male coupler 18 as shown, the actuating sleeve 56 is rotated clockwise to engage the threads 52 on the female coupler support 50 with the threads 122 on the inner housing 90 of the male coupler 18. The actuating sleeve 56 is rotated until the slots 60 on the sleeve drop into the tangs 62 on the inner housing 90 of the male coupler. When the detent locking mechanism locks, the actuating sleeve 56 is prevented from rotating relative to the inner housing 90 of the male coupler, and the female and male couplers are prevented from being disconnected unintentionally during normal operation. Upon being connected, a nipple portion 141 of the inner housing 30 is sealed to an inner diameter surface 143 of the inner housing 90 by suitable seals, such as o-ring 140 and backup rings 142 and 144 carried by a piston groove in the inner housing 30 of the female coupler.

Additionally, upon being connected an end face 146 of the female coupler poppet valve 24 is brought into contact with the end face 148 of the male coupler poppet valve 26, causing the valves 24 and 26 to move from the closed positions to the open positions. When in the open positions, the poppet valves 24 and 26 allow fluid to flow from the first sub-system 12 through the interior flow passages 70 and 130 and to the second sub-system 14.

To disconnect the female and male couplers 16 and 18, the actuating sleeve 56 is moved axially toward the first sub-system 12 to disengage the locking slots 60 from the locking tangs 62, and then rotated counterclockwise to disengage the threads 52 and 122. When the male coupler and female coupler are disconnected, the poppet valves 24 and 26 move back to the closed position to automatically shut off the flow paths to prevent fluid leaking from the sub-systems.

Figure 17:
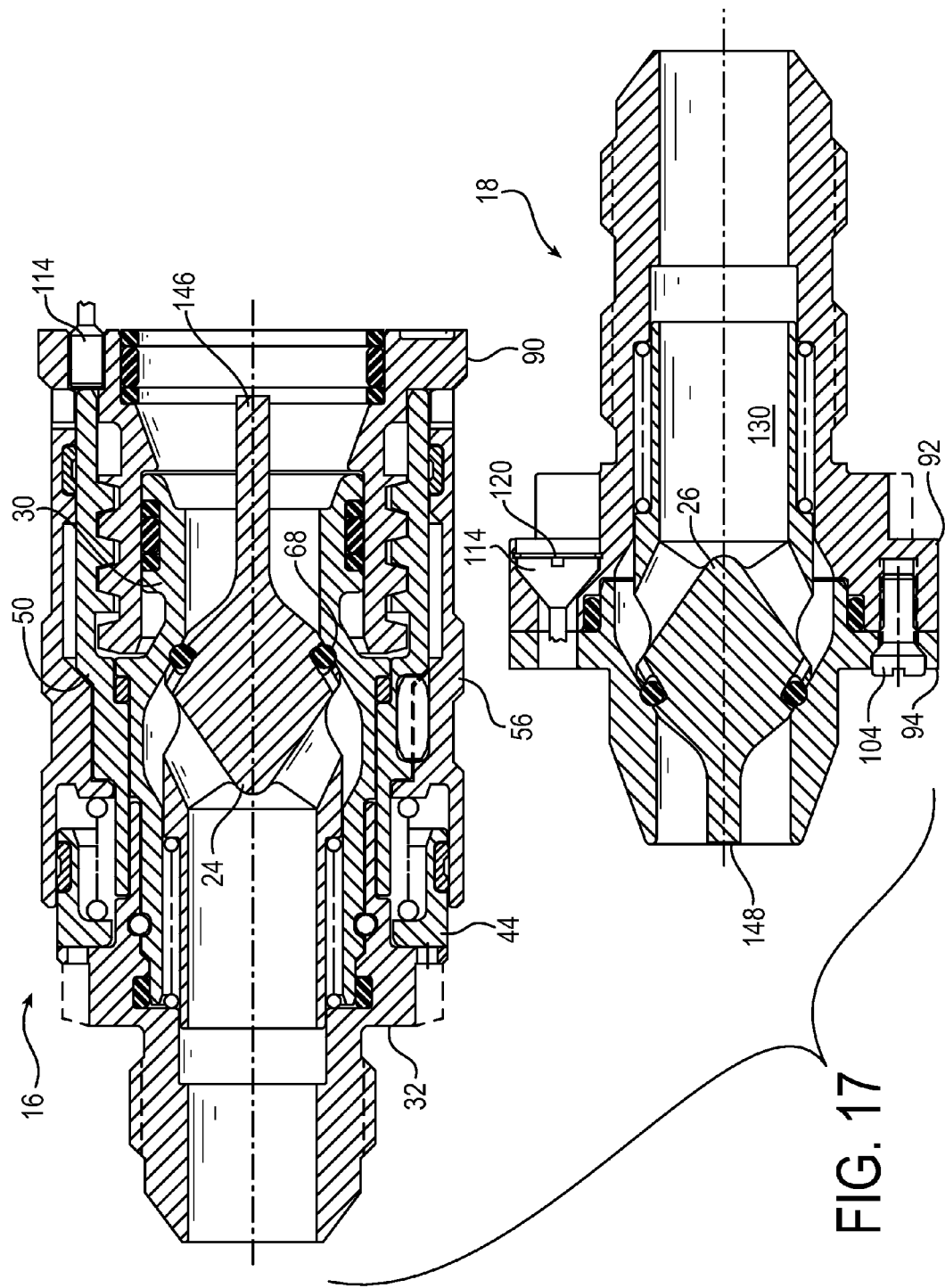
FIG. 17 is a cross sectional view of the breakaway thread-lock quick disconnect coupling after a breakaway.

In the event of high impact separation forces, for example during a hard landing when used to connect fuel lines in an aircraft, the fuse screws 114 are designed to sever and separate at the fuse neck, as shown in FIG. 17, thereby causing the male coupler support 94 and outer housing 92 to breakaway from the female coupler and the inner housing 90 to allow the poppet valves 24 and 26 to move to the closed position to prevent fluid from flowing through the couplers. Because the fuse screws 114 are designed to be the weakest linkage elements in the male coupler 18, the screws will sever and separate before any other element in the coupling along a designed breaking section. The fuse neck can be designed to break at various predetermined breaking loads based on the desired application of the male coupler, and the various loads may include shear, tension and bending loads.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A female coupler for a quick connect/disconnect coupling, the female coupler including:
    a retainer wire;
    an inner housing having a radially outwardly opening groove and a nipple portion for sealing to an inner diameter surface of a corresponding male coupler;
    an outer housing having a radially inwardly opening groove aligned with the radially outwardly opening groove, wherein the grooves form a capture space for receiving the retainer wire, the retainer wire having a dimension greater than a depth of each groove so that when the retainer wire is inserted into the capture space, the wire axially interferes with sidewalls of the grooves to restrict relative axial movement of the inner and outer housings; and
    a female coupler support having a proximal end rotatably supported on a radially outer surface of the inner or outer housing and a distal end being internally threaded for threaded receipt of an externally threaded portion of the corresponding male coupler.

2. A female coupler according to claim 1, wherein the outer housing includes a loading hole extending from a radially outer surface of the outer housing to a radially inner surface of the outer housing and through which the retainer wire can be inserted into the capture space, and wherein a sleeve radially outwardly surrounds the outer housing and is axially shiftable between a first position permitting access to the loading hole and a second position covering the access hole to prevent the retainer wire from being dislodged from the capture space.

3. A female coupler according to claim 1, further including an actuating sleeve rotatably coupled to the female coupler support for rotation therewith.

4. A female coupler according to claim 3, further including a dowel pin disposed between the actuating sleeve and the coupler support that prevents the actuating sleeve from rotating relative to the coupler support.

5. A female coupler according to claim 4, wherein the actuating sleeve is movable between a latched position and a released position.

6. A female coupler according to claim 5, wherein the actuating sleeve is biased in the latched position.

7. A female coupler according to claim 6, wherein the actuating sleeve is biased by a resilient member disposed between the actuating sleeve and the sleeve.

8. A female coupler according to claim 1, further including a poppet valve disposed interiorly of the inner housing, the poppet valve being movable between open and closed positions to open/close a flow passage in the coupler.

9. A female coupler according to claim 8, wherein the poppet valve is biased by a resilient member in the closed position.

10. A female coupler according to claim 9, wherein the poppet valve is sealed to a radially inner surface of the inner housing by a seal.

11. A male coupler for use with the female coupler of claim 1, the male coupler including:
    an inner housing being externally threaded for threaded receipt of the female coupler support at a distal end of the inner housing and having a plurality of openings;
    an outer housing having a plurality of openings;
    a male coupler support disposed between a proximal end of the inner housing and a distal end of the outer housing, the coupler support including a plurality of openings aligned with the openings in the inner and outer housings; and
    a plurality of screws disposed in the plurality of openings to couple the inner housing, outer housing and male coupler.

12. A male coupler according to claim 11, wherein the male coupler further includes a poppet valve disposed interiorly of the outer housing and the male coupler support, the poppet valve being movable between open and closed positions to open/close a flow passage in the male coupler.

13. A male coupler according to claim 12, wherein the poppet valve is biased by a resilient member in the closed position and sealed to a radially inner surface of the male coupler support by a seal.

14. A male coupler according to claim 13, wherein the screws are configured to sever when a load on the male coupler and/or female coupler exceeds a predetermined value, thereby causing the poppet valve and a poppet valve disposed interiorly of the inner housing in the female coupler to move to their closed positions to prevent fluid flow through interior passages of the female and male couplers.

15. A female coupler for a quick connect/disconnect coupling, the female coupler including:
    a female coupler support having a proximal end rotatably supported on a radially outer surface of an inner or outer housing and a distal end being internally threaded for threaded receipt of an externally threaded portion of a corresponding male coupler;
    an actuating sleeve rotatably coupled to the female coupler support for rotation therewith;
    a plurality of seals provided at interfaces of the actuating sleeve that prevent environmental particles from migrating into cavities in the female coupler; and
    a sleeve radially outwardly surrounding the outer housing and having a radially outer surface supporting a radially inner surface of the actuating sleeve, the actuating sleeve being movable relative to the sleeve,
    wherein the actuating sleeve is sealed to the sleeve at the interface of the actuating sleeve by one of the plurality of seals.

16. A female coupler according to claim 15, wherein the plurality of seals are dust rings.

17. A female coupler according to claim 15, wherein the actuating sleeve is sealed to the female coupler support at one of the interfaces of the actuating sleeve by one of the seals.

18. A female coupler according to claim 15, wherein the actuating sleeve is movable relative to the female coupler support between a latched position and a released position.

19. A quick connect/disconnect coupling including mating female and male quick connect/disconnect couplers each having a main body configured for connection to a respective sub-system, and a poppet valve disposed in an interior flow passage of the respective coupler and biased toward a closed position but movable to an open position by engagement with the poppet valve of the other coupling when the female and male couplers are coupled together, and wherein the main body of at least one of the female and male couplers includes an inner portion effecting the connection to the other coupler and an outer portion carrying the respective poppet valve, and wherein the inner and outer portions are joined to one another by a frangible connection configured to break when a load on the coupling exceeds a predetermined value, and wherein separation of the outer portion from the inner portion allows the poppet valves to disengage and move to their respective closed positions.

20. A method of closing a fluid flow path through a quick connect/disconnect coupling when a load on the coupling exceeds a predetermined value, the coupling including mating female and male couplers each having a main body configured for connection to a respective sub-system and a poppet valve disposed in an interior flow passage having a closed position and an open position, wherein the main body of at least one of the female and male couplers includes an inner portion effecting the connection to the other coupler and an outer portion carrying the respective poppet valve, and whereby the poppet valve is engaged with the poppet valve of the other coupling when the female and male couplers are coupled together, the method including:

- breaking a frangible connection that joins the inner portion and the outer portion of one of the couplers when a load on the coupling exceeds a predetermined value thereby separating one of the male or female couplers at the frangible connection;
- disengaging the poppet valves; and
- moving the poppet valves to their respective closed positions thereby closing the fluid flow path.

* * * * *